United States Patent
Seshadri

(10) Patent No.: US 8,484,739 B1
(45) Date of Patent: Jul. 9, 2013

(54) TECHNIQUES FOR SECURELY PERFORMING REPUTATION BASED ANALYSIS USING VIRTUALIZATION

(75) Inventor: Vijay Anand Seshadri, Milpitas, CA (US)

(73) Assignee: Symantec Corporation, Mountain View, CA (US)

( * ) Notice: Subject to any disclaimer, the term of this patent is extended or adjusted under 35 U.S.C. 154(b) by 784 days.

(21) Appl. No.: 12/334,844

(22) Filed: Dec. 15, 2008

(51) Int. Cl.
*G06F 11/00* (2006.01)
*G06F 12/14* (2006.01)
*G06F 12/16* (2006.01)
*G06F 11/30* (2006.01)
*G06F 15/173* (2006.01)
*G08B 23/00* (2006.01)

(52) U.S. Cl.
USPC ............. 726/25; 728/23; 713/188; 709/224

(58) Field of Classification Search
USPC .......................................................... 726/25
See application file for complete search history.

(56) References Cited

U.S. PATENT DOCUMENTS

| | | | |
|---|---|---|---|
| 5,892,904 A * | 4/1999 | Atkinson et al. | 726/22 |
| 7,213,047 B2 * | 5/2007 | Yeager et | 709/202 |
| 7,496,961 B2 * | 2/2009 | Zimmer et al. | 726/23 |
| 7,562,304 B2 * | 7/2009 | Dixon et al. | 715/738 |
| 7,761,912 B2 * | 7/2010 | Yee et al. | 726/11 |
| 7,761,917 B1 * | 7/2010 | Kumar | 726/23 |
| 7,765,481 B2 * | 7/2010 | Dixon et al. | 715/738 |
| 7,779,156 B2 * | 8/2010 | Alperovitch et al. | 709/240 |
| 7,818,343 B1 * | 10/2010 | Sekhar et al. | 707/781 |
| 7,822,620 B2 * | 10/2010 | Dixon et al. | 705/1.1 |
| 7,827,550 B2 * | 11/2010 | Daruwala et al. | 718/1 |
| 7,849,502 B1 * | 12/2010 | Bloch et al. | 726/11 |
| 7,865,908 B2 * | 1/2011 | Garg et al. | 719/321 |
| 7,865,953 B1 * | 1/2011 | Hsieh et al. | 726/22 |
| 7,882,542 B2 * | 2/2011 | Neystadt et al. | 726/3 |
| 7,908,660 B2 * | 3/2011 | Bahl | 726/25 |
| 8,341,291 B2 * | 12/2012 | Twitchell, Jr. | 709/238 |
| 2002/0069369 A1 * | 6/2002 | Tremain | 713/201 |
| 2006/0212925 A1 * | 9/2006 | Shull et al. | 726/1 |
| 2006/0230452 A1 * | 10/2006 | Field | 726/22 |
| 2007/0107059 A1 * | 5/2007 | Chasin et al. | 726/23 |
| 2007/0174915 A1 * | 7/2007 | Gribble et al. | 726/24 |
| 2008/0016570 A1 * | 1/2008 | Capalik | 726/23 |
| 2008/0021890 A1 * | 1/2008 | Adelman et al. | 707/3 |
| 2008/0082662 A1 * | 4/2008 | Dandliker et al. | 709/225 |
| 2008/0109473 A1 * | 5/2008 | Dixon et al. | 707/102 |
| 2008/0163370 A1 * | 7/2008 | Maynard | 726/22 |

(Continued)

OTHER PUBLICATIONS

Garfinkel, Tal and Mendel Rosenblum, A Virtual Machine Introspection Based Architecture for Intrusion Detection, In Proceedings of the Internet Society's 2003 Symposium on Network and Distributed System Security, accessible at http://www.stanford.eduhtalg/papers/VMI/ymi-ndss03.pdf, 2003.*

(Continued)

*Primary Examiner* — Carolyn B Kosowski
(74) *Attorney, Agent, or Firm* — Wilmer Cutler Pickering Hale and Dorr LLP

(57) ABSTRACT

Techniques for securely performing reputation based analysis using virtualization are disclosed. In one particular exemplary embodiment, the techniques may be realized as a computer implemented method for performing reputation based analysis comprising detecting a specified activity associated with a virtual client, determining a reputation associated with the specified activity, and performing an action associated with the determined reputation.

18 Claims, 3 Drawing Sheets

U.S. PATENT DOCUMENTS

| | | | |
|---|---|---|---|
| 2008/0209557 A1* | 8/2008 | Herley et al. | 726/23 |
| 2008/0222729 A1* | 9/2008 | Chen et al. | 726/24 |
| 2008/0235769 A1* | 9/2008 | Purcell et al. | 726/3 |
| 2008/0244074 A1* | 10/2008 | Baccas et al. | 709/227 |
| 2008/0320594 A1* | 12/2008 | Jiang | 726/24 |
| 2009/0044024 A1* | 2/2009 | Oberheide et al. | 713/188 |
| 2009/0049510 A1* | 2/2009 | Zhang et al. | 726/1 |
| 2009/0165133 A1* | 6/2009 | Hwang et al. | 726/22 |
| 2009/0172817 A1* | 7/2009 | Sedayao | 726/25 |
| 2009/0222922 A1* | 9/2009 | Sidiroglou et al. | 726/23 |
| 2009/0254990 A1* | 10/2009 | McGee | 726/22 |
| 2009/0282476 A1* | 11/2009 | Nachenberg et al. | 726/22 |
| 2009/0328209 A1* | 12/2009 | Nachenberg | 726/22 |
| 2010/0005291 A1* | 1/2010 | Hulten et al. | 713/156 |
| 2010/0058468 A1* | 3/2010 | Green et al. | 726/22 |
| 2010/0122343 A1* | 5/2010 | Ghosh et al. | 726/23 |

OTHER PUBLICATIONS

Clementi, "Anti-Virus Comparative Technology Preview Report McAfee Artemis", Website: http://www.av-comparatives.org, Feb. 2008; Last Revision dated: Jun. 3, 2008.

Unknown, Phoenix HyperSpace™, "Transforming the Personal Computing Experience", Phoenix Technologies, Ltd., 2 pages, (2007).

* cited by examiner

TECHNIQUES FOR SECURELY PERFORMING REPUTATION BASED ANALYSIS USING VIRTUALIZATION

FIELD OF THE DISCLOSURE

The present disclosure relates generally to securely performing reputation based analysis and, more particularly, to techniques for securely performing reputation based analysis using virtualization.

BACKGROUND OF THE DISCLOSURE

Methods of detecting malware, such as viruses, worms, and spyware, may utilize a file signature, a file origin, or other file attributes to determine if a file is harmful. Malware, however, may be designed to interfere with such determinations once a machine is infected. For example, malware may affect an infected machine's network stack, such as a network proxy, and may redirect network requests in a manner that is more difficult to detect. Thus, a network request on an infected machine may appear to be directed towards an innocuous network site and the malware may utilize an infected network proxy to redirect the request to a harmful network site.

Other actions may be taken by malware to mask, spoof, or otherwise hide the nature of a file on an infected computer, hide a request to download malware, or to hide other malware activities and/or malware attributes. As another example, malware may change network information such as Uniform Resource Locators (URLs) contained on an infected machine. That is, malware may alter browser cache files to list only safe or valid websites in the browser cache file. Malware may also affect file system drivers or network drivers to hide the presence or the identity of a file. Thus, a malware detection or prevention system may attempt to scan a system or a file being downloaded and may be provided with improper file attributes. For example, if a malware detection system attempts to determine the reputation of a file being downloaded using a fake URL provided by an infected machine, the malware detection system may incorrectly identify the file being downloaded as safe.

In view of the foregoing, it may be understood that there are significant problems and shortcomings associated with current reputation based analysis technologies.

SUMMARY OF THE DISCLOSURE

Techniques for securely performing reputation based analysis using virtualization are disclosed. In one particular exemplary embodiment, the techniques may be realized as a computer implemented method for performing reputation based analysis comprising detecting a specified activity associated with a virtual client, determining a reputation associated with the specified activity, and performing an action associated with the determined reputation.

In accordance with other aspects of this particular exemplary embodiment, detecting a specified activity may comprise utilizing a component associated with a virtualization platform to monitor one or more activities of a virtual client of the virtualization platform.

In accordance with further aspects of this particular exemplary embodiment, the component associated with a virtualization platform to monitor one or more activities of a virtual client of the virtualization platform may comprise a network proxy of the virtualization platform.

In accordance with additional aspects of this particular exemplary embodiment, one or more portions of the reputation based analysis may be performed using a process running in a portion secure from access of the virtual client.

In accordance with additional aspects of this particular exemplary embodiment, the secure portion may comprise at least one of: a secure partition, a flash drive, and secure persistent storage.

In accordance with additional aspects of this particular exemplary embodiment, the specified activity may comprise at least one of: downloading a portable executable file, downloading a specified file type, performing an action on the virtual client, and accessing a specified network resource.

In accordance with additional aspects of this particular exemplary embodiment, determining a reputation associated with the specified activity may comprise generating a indicator uniquely associated with the specified activity, and comparing the indicator with stored reputation data.

In accordance with additional aspects of this particular exemplary embodiment, the stored reputation data may comprise a network accessible data store.

In accordance with additional aspects of this particular exemplary embodiment, the comparison may generate a reputation score.

In accordance with additional aspects of this particular exemplary embodiment, generating an indicator may comprise running a hash function on data associated with the specified activity.

In accordance with additional aspects of this particular exemplary embodiment, the data associated with the specified activity may comprise at least one of: a file, a Uniform Resource Locator (URL), and a network address.

In accordance with additional aspects of this particular exemplary embodiment, performing an action associated with the determined reputation may comprise at least one of: prompting a user, blocking a file, quarantining a file, denying network access, preventing a virtual client process activity, suspending a virtual client process, terminating a virtual client process, and allowing the specified activity.

In accordance with additional aspects of this particular exemplary embodiment, the techniques may be realized as at least one processor readable medium for storing a computer program of instructions configured to be readable by at least one processor for instructing the at least one processor to execute a computer process for performing the method.

In another particular exemplary embodiment, the techniques may be realized as an article of manufacture for performing reputation based analysis, the article of manufacture comprising at least one processor readable medium, and instructions carried on the at least one medium, wherein the instructions are configured to be readable from the at least one medium by at least one processor and thereby cause the at least one processor to operate so as to detect a specified activity associated with a virtual client, determine a reputation associated with the specified activity, and perform an action associated with the determined reputation.

In yet another particular exemplary embodiment, the techniques may be realized as a system providing reputation based analysis comprising one or more processors configured to detect a specified activity associated with a virtual client, determine a reputation associated with the specified activity, and perform an action associated with the determined reputation.

In accordance with other aspects of this particular exemplary embodiment, the one or more processors may be configured to detect a specified activity by utilizing a component associated with a virtualization platform to monitor one or more activities of a virtual client of the virtualization platform.

In accordance with further aspects of this particular exemplary embodiment, the one or more processors may be further configured to perform one or more portions of the reputation based analysis using a process running in a secure portion of the virtualization platform.

In accordance with additional aspects of this particular exemplary embodiment, the specified activity may comprise at least one of downloading a portable executable file, downloading a specified file type, performing a specified action on the virtual client, and accessing a specified network resource.

In accordance with additional aspects of this particular exemplary embodiment, the one or more processors may be configured to determine a reputation associated with the specified activity by generating a indicator uniquely associated with the specified activity and comparing the indicator with stored reputation data.

In accordance with additional aspects of this particular exemplary embodiment, the one or more processors may be configured to perform a specified action associated with the determined reputation by at least one of prompting a user, blocking a file, quarantining a file, denying network access, preventing a virtual client process activity, suspending a virtual client process, terminating a virtual client process, and allowing the specified activity.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
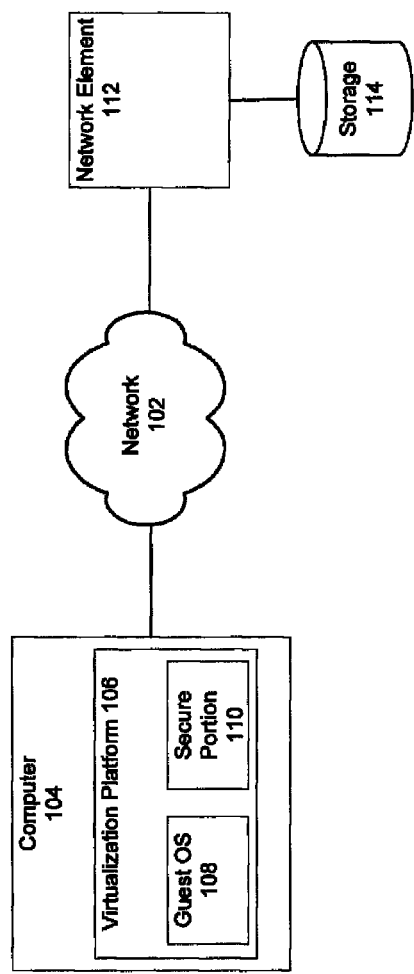
FIG. 1 shows a system for securely performing reputation based analysis using virtualization in accordance with an embodiment of the present disclosure.

Referring to FIG. 1, there is shown a system 100 for securely performing reputation based analysis using virtualization in accordance with an embodiment of the present disclosure. FIG. 1 is a simplified view of system 100, which may include additional elements that are not depicted. The system 100 comprises network element 112, network 102 and computer 104. Network element 112 may be communicatively coupled to network 102. Computer 104 may be communicatively coupled to network 102. Computer 104 may comprise virtualization platform 106, which in turn may comprise guest Operating System (OS) 108, and secure portion 110. Storage 114 may be communicatively coupled to network element 112.

Network 102 may be a local area network (LAN), a wide area network (WAN), the Internet, a cellular network, a satellite network, or another network that permits communication between network element 112, computer 104, and other devices communicatively coupled to network 102.

Network element 112 may be an application server, a backup server, a network storage device, a media server, or other device communicatively coupled to network 102. Network element 112 may utilize storage 114 for the storage of reputation data, malware signatures, reputation logic, or other data. In other embodiments, network element 112 may represent a network appliance connected to a storage area network.

Storage 114 may be network accessible storage and may be local, remote, or a combination thereof to network element 112. Storage 114 may utilize a tape, disk, a storage area network (SAN), or other computer accessible storage. In one or more embodiments, storage 114 may be a database.

In one or more embodiments, network element 112 may be a server providing cloud based security. Storage 114 may store reputation data utilized by network element 112. Reputation data may include file attributes, file signatures, file patterns, network addresses, URLs, process names, or other unique file or network indicators.

Computer 104 may be a desktop computer, a laptop computer, a server, or other processing device capable of hosting a virtualization platform. Computer 104 may receive data from user input, a database, a file, a web service, and/or an application programming interface. Computer 104 may comprise one or more components, such as virtualization platform 106, which in turn may comprise guest OS 108 and secure portion 110.

Virtualization platform 106 may be a hypervisor, a virtual machine monitor, or another platform which may enable multiple operating systems to run on computer 104 at the same time. For example, virtualization platform 106 may utilize VMware™, Phoenix Hyperspace™ or other products. Virtualization platform 106 may enable one or more guest operating systems, such as guest OS 108, to run.

Guest OS 108 may be a guest operating system of virtualization platform 106. Guest OS 108 may be an operating system such as Microsoft Windows XP®, Microsoft Vista®, Linux, or other operating system. Guest OS 108 may be a full version of an operating system. However, virtualization platform 106 may provide one or virtualized resources and guest OS 108 may not access resources of computer 104 directly. For example, virtualization platform 106 may provide virtualized hardware to guest OS 108, such as virtualized disk storage, virtualized network interfaces, or other virtualized resources.

Secure portion 110 may be a portion of virtualization platform 106 separate from guest OS 108 and inaccessible to guest OS 108. Secure portion 110 may also be outside of virtualization platform 106 and may reside on computer 104 or may be communicatively coupled to computer 104. Secure portion 110 may be a secure partition, a flash drive, or other secure persistent storage. Secure portion 110 may comprise an operating system used to host virtualization platform 106. Secure portion 110 may comprise one or more components capable of monitoring one or more virtualized resources of guest OS 108.

In one or more embodiments, secure portion 110 may comprise an agent or another process for performing reputation based analysis for one or more virtual clients of virtualization platform 106. The agent may be capable of monitoring one or more activities of guest OS 108 by monitoring communications from guest OS 108 to virtualization platform 106. For example, an agent may monitor network requests of guest OS 108 from outside of guest OS 108 by monitoring network communications in the network stack outside of guest OS 108. This may prevent malware located in guest OS 108 from interfering with the monitoring. While malware on an infected virtual machine may alter URLs within the virtual machine, it may use the actual URL in network requests to the virtualized network interface. Thus, network traffic from guest OS 108 to the virtual machine monitor may contain the actual URL in order for the malware to access its intended network resource.

An agent on secure portion 110 may monitor this network traffic and may generate an indicator uniquely associated with one or more portions of the network traffic. For example, an agent on secure portion 110 may detect a URL requested by guest OS 108, which may be associated with the downloading of an executable file, such as an .exe file, a .dll file, object code, or other executable file types. The agent on secure portion 110 may generate an indicator uniquely associated with the URL and/or the requested file. The agent on secure portion 110 may generate the indicator by running a hash function, such as a Message-Digest Algorithm 5 (MD5) function or a Secure Hash Algorithm (SHA) function. A resulting hash value may be compared by the agent to reputation analysis data. An agent or other process running on secure portion 110 may utilize an Application Programming Interface (API), a database query, a web service, or other interface to obtain reputation analysis data.

Reputation analysis may be performed on computer 104, remote from computer 104, or on a plurality of computing platforms. For example, an agent or other process running on secure portion 110 may interface with network element 112, which may be a server providing cloud based security. Network element 112 may query storage 114 to determine a reputation score or other analytical benchmark of an indicator provided by the agent.

An agent running on secure portion 110, a component of virtualization platform 106, and/or a process running on computer 104 may perform reputation based analysis of other activities. For example, file system requests of guest OS 108 may be analyzed. The modification of files or file system attributes, the creation of files, and/or the deletion of files may be monitored securely from outside of guest OS 108. As another example, a process running on secure portion 110 may monitor a file system driver associated with virtualization platform 106 and may request or perform reputation analysis of one or more files or file system activities. Malware on guest OS 108 may not be capable of affecting processes outside of its managed virtual environment, and thus may not be capable of interfering with detection and/or prevention of harmful activity. An agent running on secure portion 110, a component of virtualization platform 106, and/or a process running on computer 104 may also perform reputation based analysis of other activities, such as the spawning of harmful processes.

Reputation analysis data may contain ratings or other indicators to determine what action should be performed in response to data associated with a hash value. For example, reputation analysis data may provide an indicator that provides a high score if data associated with a hash value is likely to be malware or otherwise detrimental to a user. In other embodiments, a low score or other indicator may be provided for detrimental data. Reputation analysis data may use a store of analysis ratings of files, URLs, Uniform Resource Indicators (URIs), network addresses, domain names, email addresses, network addresses, keywords, file names, or other analyzed data. Reputation analysis data may be associated with hash values, indexes, keys, or attributes, which may facilitate the lookup and usage of reputation analysis data. In one or more embodiments, reputation analysis data may be stored remotely, such as on storage 114. In some embodiments, reputation analysis data may be stored locally, such as on or associated with computer 104.

An agent running on secure portion 110, a component of virtualization platform 106, and/or a process running on computer 104 may take one or more actions in response to reputation analysis. For example, an agent running on secure portion 110 may prompt a user with the results of reputation analysis and a choice of actions, such as, allow a download, deny a download, request help, clean a download, and/or quarantine a download. Actions may depend on a reputation analysis result and a type of data and/or activity being analyzed. For example, a score may be assigned to a file or a URL as a result of a reputation analysis. One or more actions taken may depend on the score and a variety of actions may be assigned by score range. A first range may indicate a safe activity or file, a second range may indicate an activity or file for which a warning is to be provided, and a third range may indicate an activity or file which is to be denied or blocked.

Figure 2:
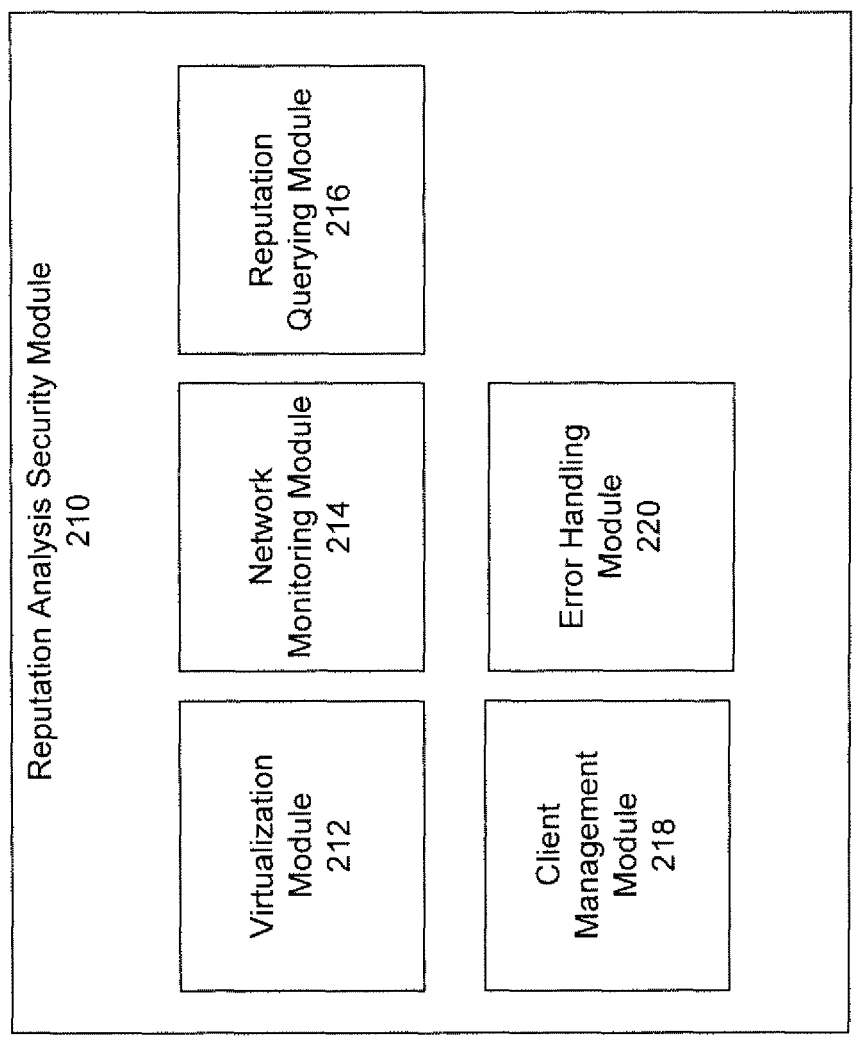
FIG. 2 shows a module for securely performing reputation based analysis using virtualization in accordance with an embodiment of the present disclosure.

Referring to FIG. 2, there is shown a reputation analysis security module 210 for securely performing reputation based analysis using virtualization in accordance with an embodiment of the present disclosure. As illustrated, reputation analysis security module 210 may comprise one or more components including virtualization module 212, network monitoring module 214, reputation querying module 216, client management module 218, and error handling module 220.

Virtualization module 212 may be implemented using one or more virtualization packages or hypervisors, such as VMware™, Phoenix Hyperspace™, or other products. Virtualization module 212 may enable one or more virtual machines or guest operating systems to run, and may provide resources such as virtualized hardware. In some embodiments, guest OS's may run natively and without modification. Guest OS's may not have access to other guest OS's, other processes running on a same computing platform, or resources not provided by virtualization module 212.

Network monitoring module 214 may enable monitoring of network activity of one or more guest OS's, virtual machines, or virtual environments hosted by virtualization module 212. Network monitoring module 214 may monitor a network driver to analyze network activity of a guest OS outside of the guest OS. This may ensure that network monitoring is not tampered with by malware. Network monitoring module 214 may also monitor other resources and/or processes of a guest OS by monitoring such resources or processes from outside of the guest OS. Network monitoring module 214 may request reputation analysis from reputation querying module 216. In some embodiments, network monitoring module 214 may request reputation analysis if the network activity meets one or more specified criteria, such as the download of a specified file type.

Reputation querying module 216 may generate indicia of a file type, network activity, or other activity for which reputation analysis is to be performed. For example, reputation querying module 216 may use a hash function to generate a hash value of a file, a network address, a URL, or other attribute associated with data or activity to be analyzed. Reputation querying module 216 may utilize the indicia to query a data store of reputation analysis data. The data store may be located locally to a computing platform being analyzed or remote from the computing platform being analyzed. The data store may contain information enabling reputation querying module 216 to score, rate, or otherwise gauge the analyzed data or activity according to one or more factors. For example, reputation analysis may rate safety, quality, risk, performance, or other attributes of a file or a network site being accessed by a guest OS.

Client management module 218 may enable one or more actions to be taken in response to a reputation analysis determination, such as a score or rating. Actions may include prompting a user of a guest OS, blocking an action, permitting an action, and/or denying an action.

Error handling module 220 may handle errors with reputation analysis, network monitoring, or client management. Error handling module 220 may log errors, such as errors occurring during reputation analysis (e.g., URL unknown or unrated). Error handling module 220 may produce one or more reports, such as reports of denied activity or denied data, permitted activity, other actions taken, network addresses accessed, files accessed, or other guest OS activity monitored.

Figure 3:
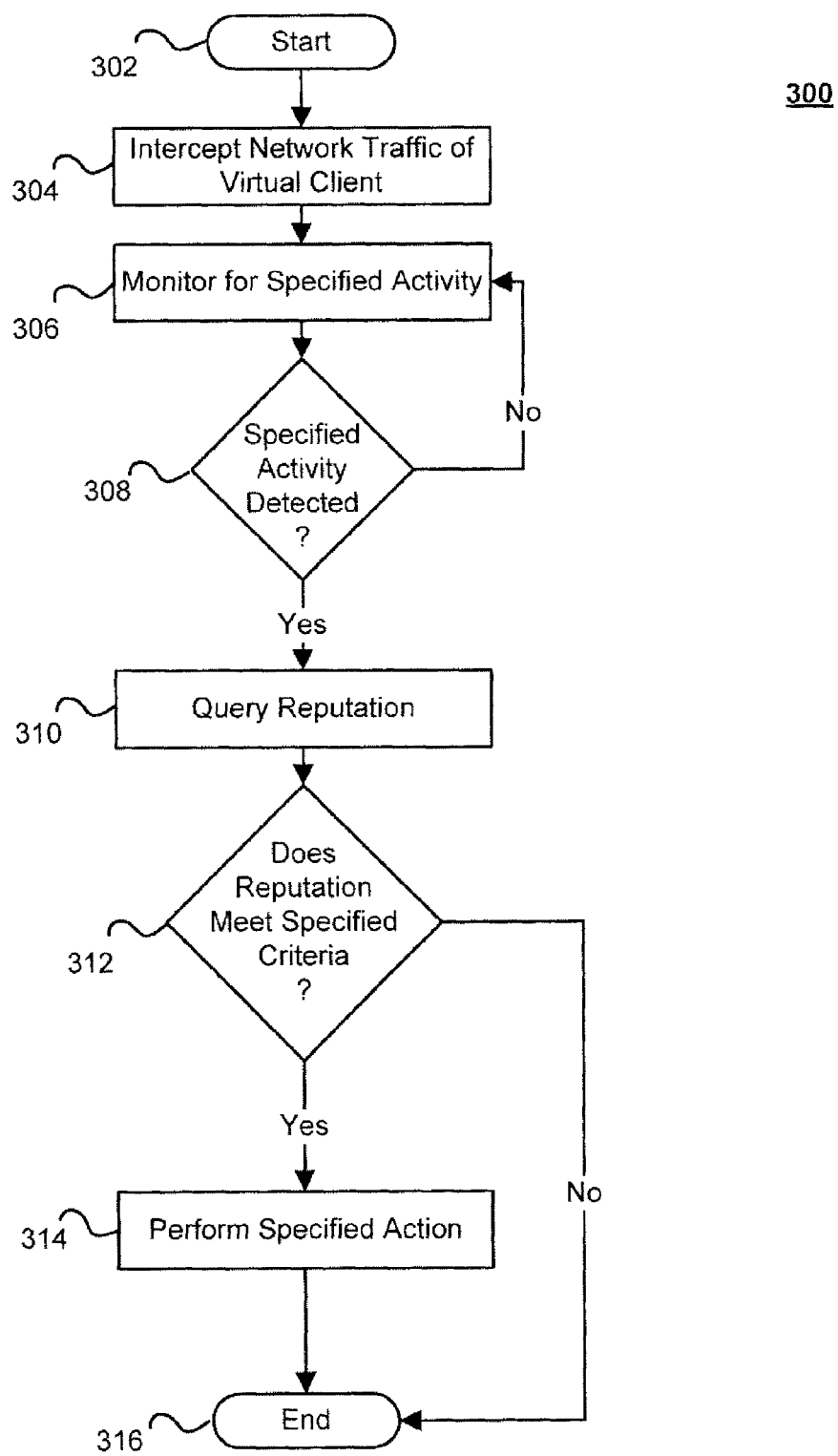
FIG. 3 depicts a method for securely performing reputation based analysis using virtualization in accordance with an embodiment of the present disclosure.

Referring to FIG. 3, there is depicted a method 300 for securely performing reputation based analysis using virtualization, in accordance with an embodiment of the present disclosure.

At block 302, the method 300 for securely performing reputation based analysis using virtualization may begin.

At block 304, the method 300 may intercept network traffic of a virtual client. Network traffic may be intercepted outside of a virtual client and such interception and/or monitoring may be invisible to a virtual client and may not significantly affect performance of the virtual client.

At block 306, the method 300 may monitor network traffic for specified activity. Specified activity may include certain types of network activity, such as instant messaging, FTPing, and or remote file access. Specified activity may also include a network request to a specified URL or network address, or a local file system request.

At block 308, the method 300 may determine if specified activity has occurred. If specified activity has occurred, the method may continue at block 310. If no specified activity has occurred, the method may continue monitoring at block 306.

At block 310, the method 300 may query or otherwise interface with a data store or another computing platform to determine a reputation of an analyzed activity or portion of data. Indicia may be generated that is uniquely associated with the analyzed activity or portion of data, and the indicia may be utilized to identify a reputation. The indicia may be a hash value or other unique identifier associated with the analyzed activity or portion of data. In one or more embodiments, a URL or network address, uniquely associated with analyzed activity or a portion of data, may be utilized to query a reputation from a data store or another computing platform.

At block 312, the method 300 may receive reputation analysis, and may determine whether the reputation analysis meets one or more specified criteria. The reputation analysis may be a score or other rating. If the reputation analysis meets specified criteria, the method 300 may continue at block 314. If the reputation analysis does not meet specified criteria, the reputation analysis may end at block 316 (e.g., the file or activity may be ignored). The specified criteria may provide one or more ranges of criteria.

At block 314, the method 300 may perform one or more specified actions. The specified actions may be determined by the reputation analysis meeting the specified criteria. For example, a file that receives a reputation analysis rating within a specified range may be blocked or denied. Other actions may be performed.

At block 316, the method 300 may end.

At this point it should be noted that securely performing reputation based analysis using virtualization in accordance with the present disclosure as described above typically involves the processing of input data and the generation of output data to some extent. This input data processing and output data generation may be implemented in hardware or software. For example, specific electronic components may be employed in a reputation analysis device or similar or related circuitry for implementing the functions associated with secure reputation analysis in accordance with the present disclosure as described above. Alternatively, one or more processors operating in accordance with instructions may implement the functions associated with secure reputation analysis in accordance with the present disclosure as described above. If such is the case, is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer implemented method for performing reputation based analysis comprising:
   detecting a specified activity associated with a virtual client, wherein the activity includes at least one of: spawning a process, analysis of a file, and file system activity, wherein detecting a specified activity comprises utilizing a network proxy of a virtualization platform to monitor one or more activities of a virtual client of the virtualization platform;
   determining, using at least one computer processor, a reputation associated with the specified activity; and
   performing an action associated with the determined reputation, wherein performing an action associated with the determined reputation comprises:
     determining a score based on the determined reputation;
     identifying a location of the determined score in at least one range; and
     performing an action associated with the at least one range.

2. The computer implemented method of claim 1, further comprising: performing one or more portions of the reputation based analysis using a process running in a portion secure from access of the virtual client.

3. The computer implemented method of claim 2, wherein the secure portion comprises at least one of: a secure partition, a flash drive, and secure persistent storage.

4. The computer implemented method of claim 1, wherein the specified activity comprises at least one of: downloading a portable executable file, downloading a specified file type, and accessing a specified network resource.

5. The computer implemented method of claim 1, wherein determining a reputation associated with an activity further comprises:
   generating a indicator uniquely associated with the specified activity; and
   comparing the indicator with stored reputation data.

6. The computer implemented method of claim 5, wherein the stored reputation data comprises a network accessible data store.

7. The computer implemented method of claim 5, wherein the comparison generates a reputation score.

8. The computer implemented method of claim 5, wherein generating an indicator comprises running a hash function on data associated with the specified activity.

9. The computer implemented method of claim 8, wherein the data associated with the specified activity comprises at least one of: a file, a Uniform Resource Locator (URL), and a network address.

10. The computer implemented method of claim 1, wherein performing an action associated with the determined reputation comprises at least one of: prompting a user, blocking a file, quarantining a file, denying network access, preventing a virtual client process activity, suspending a virtual client process, terminating a virtual client process, and allowing the specified activity.

11. The computer implemented method of claim 1, wherein detecting a specified activity associated with a virtual client comprises monitoring a file system driver of the virtualization platform.

12. At least one non-transitory processor readable storage medium for storing a computer program of instructions configured to be readable by at least one processor for instructing the at least one processor to execute a computer process for performing the method as recited in claim 1.

13. An article of manufacture for performing reputation based analysis, the article of manufacture comprising:
   at least one non-transitory processor readable storage medium; and
   instructions carried on the at least one medium;
   wherein the instructions are configured to be readable from the at least one medium by at least one processor and thereby cause the at least one processor to operate so as to:
      detect a specified activity associated with a virtual client, wherein the activity includes at least one of: spawning a process, analysis of a file, and file system activity, wherein detecting a specified activity comprises utilizing a network proxy of a virtualization platform to monitor one or more activities of a virtual client of the virtualization platform;
      determine a reputation associated with the specified activity; and
      perform an action associated with the determined reputation, wherein performing an action associated with the determined reputation comprises:
         determining a score based on the determined reputation;
         identifying a location of the determined score in at least one range; and
         performing an action associated with the at least one range.

14. A system providing reputation based analysis comprising:
   one or more processors configured to:
      detect a specified activity associated with a virtual client, wherein the activity includes at least one of: spawning a process, analysis of a file, and file system activity, wherein the one or more processors are configured to detect the specified activity by utilizing a network proxy of a virtualization platform to monitor one or more activities of a virtual client of the virtualization platform;
      determine a reputation associated with the specified activity; and
      perform an action associated with the determined reputation, wherein performing an action associated with the determined reputation comprises:
         determining a score based on the determined reputation;
         identifying a location of the determined score in at least one range; and
         performing an action associated with the at least one range.

15. The system of claim 14, wherein the one or more processors are further configured to: perform one or more portions of the reputation based analysis using a process running in a secure portion of the virtualization platform.

16. The system of claim 14, wherein the specified activity comprises at least one of: downloading a portable executable file, downloading a specified file type, and accessing a specified network resource.

17. The system of claim 14, wherein determining a reputation associated with an activity further comprises:
   generating a indicator uniquely associated with the specified activity; and
   comparing the indicator with stored reputation data.

18. The system of claim 14, wherein the one or more processors are configured to perform a specified action associated with the determined reputation by at least one of: prompting a user, blocking a file, quarantining a file, denying network access, preventing a virtual client process activity, suspending a virtual client process, terminating a virtual client process, and allowing the specified activity.

* * * * *